United States Patent [19]

Williams, Jr.

[11] Patent Number: 4,706,831
[45] Date of Patent: Nov. 17, 1987

[54] ELECTRICAL BOX WITH LATERALLY OPEN POLYGONAL BORE

[75] Inventor: Howard M. Williams, Jr., Emmaus, Pa.

[73] Assignee: Hubbell Incorporated, Orange, Conn.

[21] Appl. No.: 11,245

[22] Filed: Feb. 5, 1987

[51] Int. Cl.[4] .............................................. F16B 39/00
[52] U.S. Cl. ..................................... 220/3.2; 220/3.4; 220/3.5
[58] Field of Search .......................... 220/3.2, 3.4, 3.5; 174/53, 54, 58

[56] References Cited

U.S. PATENT DOCUMENTS

| | | | |
|---|---|---|---|
| Re. 29,752 | 9/1978 | Jaconette | 339/14 R |
| 2,775,916 | 1/1957 | Baxter et al. | 85/32 |
| 2,867,349 | 1/1969 | Parker | 220/3.3 |
| 3,263,949 | 8/1966 | Conrad | 248/74 |
| 3,740,451 | 6/1973 | Schindler | 220/3.2 |
| 3,876,821 | 4/1975 | Pringle | 174/53 |
| 3,952,475 | 4/1976 | Paskert | 220/3.4 |
| 3,967,049 | 6/1976 | Brandt | 174/53 |
| 4,012,580 | 3/1977 | Arnold | 220/3.2 |
| 4,025,144 | 5/1977 | Thibeault | 339/133 R |
| 4,069,448 | 1/1978 | Gernhardt | 220/3.2 |
| 4,071,159 | 1/1978 | Robinson et al. | 220/3.5 |
| 4,105,862 | 8/1978 | Hoehn | 220/3.2 |
| 4,130,335 | 12/1978 | Kinney | 339/122 R |
| 4,214,667 | 7/1980 | Lass | 220/3.5 |
| 4,265,365 | 5/1981 | Boteler | 220/3.3 |
| 4,295,003 | 10/1981 | Borja et al. | 174/53 |
| 4,304,958 | 12/1981 | Neff et al. | |
| 4,315,100 | 2/1982 | Haslbeck et al. | 220/3.2 |
| 4,348,547 | 9/1982 | Bowden, Jr. | 220/3.2 X |
| 4,355,198 | 10/1982 | Gartland | 174/66 |
| 4,366,343 | 12/1982 | Slater et al. | 220/3.2 X |
| 4,389,535 | 6/1983 | Slater et al. | 220/3.2 X |
| 4,424,405 | 1/1984 | Nattel | 220/3.2 |
| 4,580,689 | 4/1986 | Slater | 220/3.4 X |
| 4,666,055 | 5/1987 | Lewis | 220/3.2 |

FOREIGN PATENT DOCUMENTS 872839 7/1961 United Kingdom .

OTHER PUBLICATIONS

Sample of Carlon Electrical Box.

Primary Examiner—Steven M. Pollard
Attorney, Agent, or Firm—Jerry M. Presson; Mark S. Bicks; Alfred N. Goodman

[57] ABSTRACT

An electrical outlet box formed of metallic material has an integral boss that angularly aligns, engages and retains wiring device mounting screws. The boss has a bore for receiving the screw comprising in sequence a cylindrical surface having a diameter slightly larger than the crest diameter of the mounting screw threads, and a self-tapping surface defining generally a regular hexagon in transverse cross section. The hexagon has a diameter across its corners slightly larger than the crest diameter of the screw threads, and a diameter across its flat sides slightly larger than the root diameter of the screw threads and slightly smaller than the crest diameter of the screw threads. A slot extends laterally from the bore and into the boss.

22 Claims, 7 Drawing Figures

4,706,831

ELECTRICAL BOX WITH LATERALLY OPEN POLYGONAL BORE

FIELD OF THE INVENTION

The invention relates to an electrical outlet or wiring box formed of metallic material which has a pair of integral bosses that align, engage and retain the mounting screws for wiring devices, electrical fixtures, covers and the like. The bosses each have at least one polygonal mounting bore having a diameter across corners slightly larger than the crest diameter of the mounting screw threads, and a diameter across the flat sides slightly smaller than the crest diameter of the screw threads and slightly larger than the root diameter of the screw threads. The mounting bore has a slot extending from it and opening it laterally.

BACKGROUND OF THE INVENTION

To conveniently support an electrical wiring device, such as a switch or a receptable, an electrical lighting fixture, or simply a cover plate, an electrical outlet or wiring box is mounted in an opening made in a wall or ceiling and the electrical apparatus or cover plate is fastened to the box by means of mounting scres. Conventional electrical outlet boxes are formed from plastic or metal, e.g., aluminum, and typically have performed internally threaded bores for receiving and threadedly engaging the mounting screws, or have spring clips or other inserts to fasten the mounting screws to the electrical box as the screw passes through a bore formed in each of the box bosses. The use of performed threads or inserts in the bore is too expensive.

Examples of these prior art devices regarding outlet boxes as well as other screw retaining assemblies are disclosed in the following U.S. Pat. Nos.: Re. 29,752 to Jaconette, Jr.; 3,263,949 to Conrad; 3,876,821 to Pringle; 3,967,049 to Brandt; 4,025,144 to Thibeault; 4,130,335 to Kinney; 4,295,003 to Borja et al; and 4,355,198 to Gartland, Jr.

Commonly assigned, U.S. Pat. No. 4,580,689, entitled "Electrical Outlet Box With Integral Screw Aligning, Engaging And Retaining Boss" and issued Apr. 8, 1986, to William E. Slater discloses a nonmetallic box for supporting a device by a screw. The box comprises a boss with a through bore. The through bore has, in sequence from the boss front face, a frustoconical surface, a first cylindrical surface having a diameter slightly larger than the crest diameter of the screw threads, and a second self-tapping cylindrical surface having a diameter slightly smaller than the crest diameter of the screw threads and slightly larger than the root diameter of the screw threads. The subject matter of this patent is hereby incorporated by reference.

Commonly assigned, copending U.S. patent application Ser. No. 808,817, entitled "Electrical Outlet Box with Polygonal Mounting Bore" and filed Dec. 13, 1985, to Thomas E. Lewis, discloses a nonmetallic outlet box for supporting an electrical device by a threaded screw having screw threads with a crest diameter and a root diameter. The outlet box comprises a boss integrally formed with the box and having a front face. A straight, laterally closed bore extends inwardly of the boss from its front face for receiving the screw. This bore has a substantially regular polygonal configuration, i.e., the polygon has equal sides and included angles. The polygonal configuration has an even number of sides, preferably in the form of a hexagon, and has a diameter across its corners slightly larger than the crest diameter of the screw threads, and a diameter across its flat sides slightly smaller than the crest diameter of the screw threads and slightly larger than the root diameter of the screw threads.

This arrangement maximizes the ratio of stripping torque to running or threading torque by only tapping threads in parts of the flat sides of the polygon. The subject matter of this copending patent application is hereby incorporated by reference.

However, the laterally closed bore presents potential problems in manufacture and use with metallic, particularly aluminum, boxes. Molding the cross-sectionally hexagonal bores requires long and slender projections on the mold. For aluminum boxes, as compared to plastic boxes, the long and slender projections are more likely to break because of the higher temperature cycles, pressures, density and abrasive characteristics of the aluminum. The torque necessary for forming the threads in aluminum boxes with the mounting screws is greater than that for plastic boxes.

Accordingly, there is a continuing need for improvement in rapidly, easily and economically mounting various types of electrical devices or covers to metallic and nonmetallic outlet boxes, and for forming those outlet boxes.

SUMMARY OF THE INVENTION

An object of the present invention is to provide an electrical box with screw receiving, self-tapping bores which are easy to tap with machine mounting screws and securely retain the screws.

Another object of the invention is to provide an electrical box having an integral screw aligning, engaging and retaining boss which requires no extra pieces to secure a mounting screw thereto, thereby decreasing the cost of manufacture, the amount of inventory control needed, and the chance of losing parts thereof.

A further object of the invention is to provide an electrical box that provides a secure installation of a wiring device, fixture, cover plate and the like by means of a strong and durable connection between the mounting screw and the outlet box.

Yet another object of the invention is to provide a metallic electrical box that is easier to manufacture and use.

The foregoing objects are basically attained by providing an electrical box for supporting an electrical device by a threaded screw having screw threads with a crest diameter and a root diameter. The electrical box comprises a boss integrally formed with the box and having a front face. A straight bore extends inwardly of the boss from the front face for receiving the screw. This bore has a substantially regular polygonal configuration, i.e., the polygon has equal sides and included angles, and has a slot extending laterally from it and into the boss.

The polygonal configuration has an even number of sides, preferably in the form of a hexagon, and has a diameter across its corners slightly larger than the crest diameter of the screw threads, and a diamter across its flat sides slightly smaller than the crest diameter of the screw threads and slightly larger than the root diameter of the screw threads.

This arrangement facilitates insertion of the machine screw, and securely retains the machine screw in the self-tapped bore. More specifically, this arrangement maximizes the ratio of stripping torque to running or threading torque by only tapping threads in parts of the flat sides of the polygon.

The slot permits the long and slender mold projection forming the bore in the boss to reinforced by an appropriately formed lateral member, corresponding in shape to that of the slot. With this reinforcement, the mold projections can withstand the higher temperatures, pressures, densities and abrasive characteristics experienced in molding aluminum. Additionally, the slot reduces the threading torque required by reducing the surfaces to be threaded.

Other objects, advantages and salient features of the invention will become apparent from the following detailed description, which, taken in conjunction with the annexed drawings, discloses prefered embodiments of the invention.

BRIEF DESCRIPTION OF THE DRAWINGS

Referring to the drawings which form a part of this disclosure.

DETAILED DESCRIPTION OF THE PREFERRED EMBODIMENT

Figure 1:
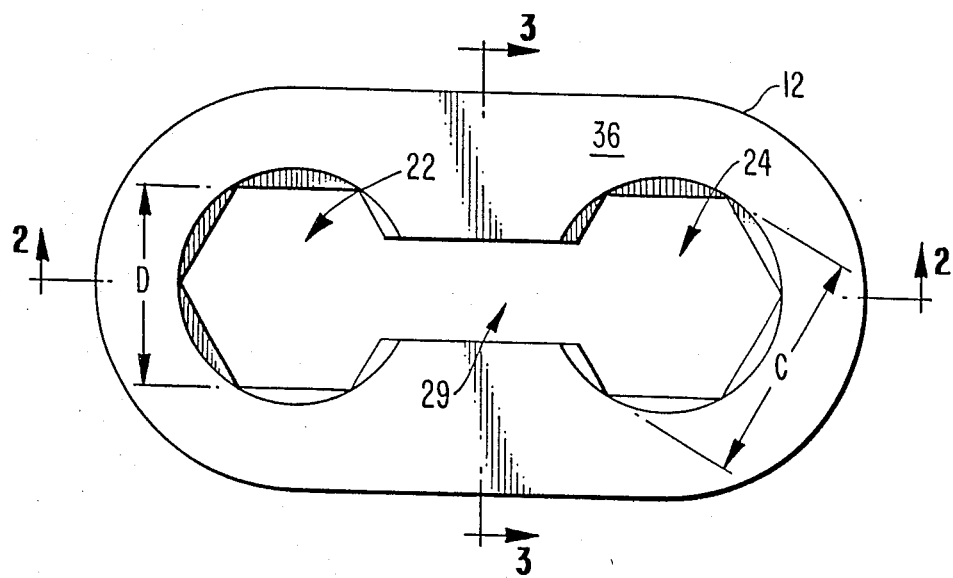
FIG. 1 is a top plan view of a boss of an electrical box in accordance with one embodiment of the present invention.
Figure 2:
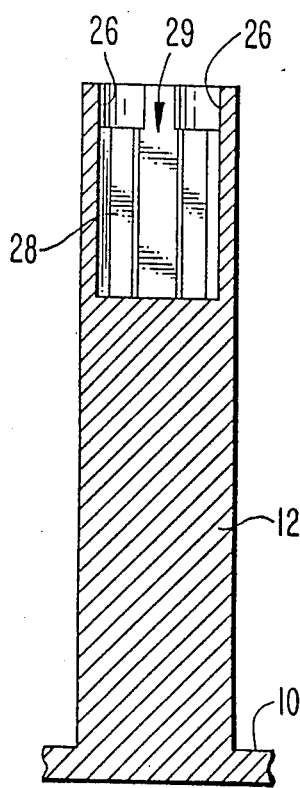
FIG. 2 is a reduced, front elevational view in longitudinal section taken along line 2—2 of FIG. 1.
Figure 3:
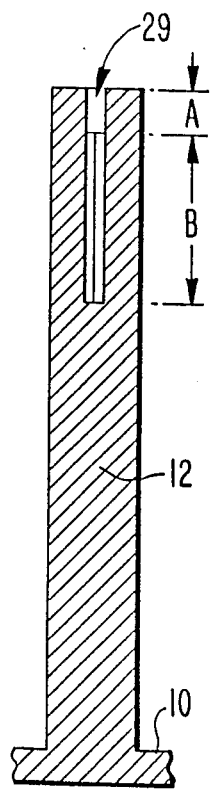
FIG. 3 is a reduced, side elevational view in longitudinal section taken along line 3—3 of FIG. 1.
Figure 4:
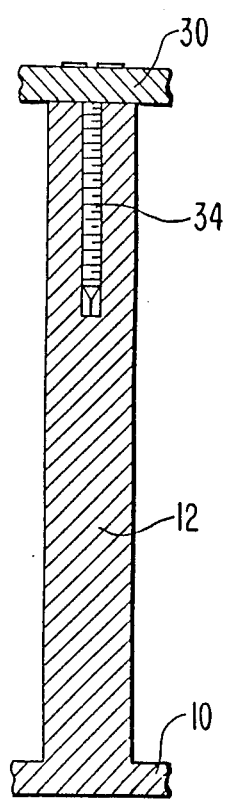
FIG. 4 is a side elevational section of the boss of FIG. 3 with a mounting strap and screw.

Referring initially to FIGS. 1-4, the electrical outlet or wiring box 10 in accordance with the present invention is intended to be received in an opening in a wall. A wiring device in the form of an outlet, receptacle or switch is mounted in the box by screws. Outlet box 10 has bosses 12 integrally formed thereon for aligning, engaging and retaining the mounting screws therein. As described in more detail hereinafter, each boss has blind bores 22 and 24. Each bore comprises a substantially cylindrical surface 26 and a set of planar surfaces 28 defining a regular hexagon in transverse section, in sequence. The combination of these portions of the bore align, engage and retain the screw therein. The bores are joined by a slot 29 passing through and eliminating a corner and portions of two sides of the hexagon.

Outlet box 10 is formed as a one-piece, unitary integrally molded member from a suitable metallic material, preferably aluminum. The box is conventionally mounted on a support which may be a floor or wall portion of a structure. The box may also be designed to mount a ceiling lighting fixture or other device to a ceiling support. The rear of the outlet box has a plurality of openings, not shown, for receiving electrical wires therethrough, these wires entering the box for electrical connection to, for example, a conventional wiring device or an electrical fixture.

Figure 7:
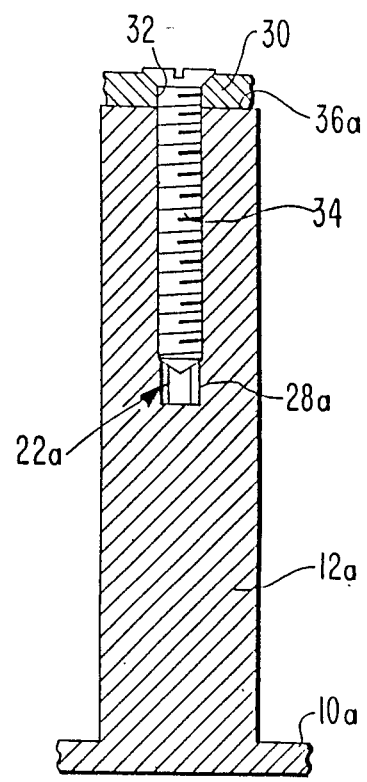
FIG. 7 is a side elevational view in longitudinal section of the boss of FIG. 6 with a mounting strap and screw.

The wiring device has a mounting strap 30 is advantageously formed of metal and having an elongated aperture 32 (see FIG. 7). This aperture is aligned with boss 12 in the outlet box 10 and receives the mounting screws 34 therein to rigidly couple the wiring device to the box. As is evident from FIG. 7, the aperture in the mounting strap is wide enough to receive the shank of the screw, but is smaller than the head of the screw.

Boss 12, as illustrated in FIG. 1, has an overall length of about 0.484 inch and a width of about 0.282 inch. It has a planar front face 36 and an outer surface which is arcuate at its ends and planar on the opposed sides. The arcuate portions have centers of curatures on the axes of the bores and have a radius of curvature of about 0.141 inch. The planar sides extend substantially tangentially to the semi-cylindrical arcuate portions of the outer surface. The bores 22 and 24 are straight and extend into the boss from the front face 36, terminating intermediate the length of the boss.

Each bore comprises a substantially cylindrical surface 26 extending from the front face of the boss, and a hexagonal section 28 extending from the cylindrical surface. The hexagonal section terminates between the ends of the boss.

Cylindrical surface 26 forms an aligning and engaging portion in the boss. This is essentially a pocket for guiding and angularly aligning the mounting screw substantially coaxially with the bore and for engaging the screw, upon its initial insertion therein, to resist inadvertent removal of the screw. The cylindrical surface 26 has an axial length A equal to about 0.125 inch.

The hexagonal portion 28 is a screw retaining portion which is self tapping via the threads on the mounting screw 34. The hexagonal portion 28 is coaxial with the cylindrical surface and has an axial length B of about 0.500 inch. The hexagon defined by the transverse cross section of portion 28 has a first diameter C across its corners and a second diameter D perpendicularly across its flat sides. First diameter C also defines the cross-sectional diameter of cylindrical surface 26.

Suitable dimensions to accommodate a 6-32 screw for the first and second diameters in inches, ±+0.002 inch or broader tolerance ranges mandated in mass producing the boxes by die casting, are as follows:

| Core No. | D | C |
| --- | --- | --- |
| 1 | 0.126 | 0.146 |
| 2 | 0.124 | 0.143 |
| 3 | 0.122 | 0.141 |
| 4 | 0.120 | 0.139 |

Defined at the interface between the cylindrical surface and the hexagonal portion is a shoulder 38 which lies in a plane substantially parallel to the front face 36 of the boss and perpendicular to the longitudinal axes of bore 22 and the cylindrical surface.

The mounting screw 36 includes a head and a threaded shank integrally formed therewith and having a tapered tip. The head has a flat circular outer surface interrupted by a diamatric slot for receiving a screwdriver and a frustoconical inner surface extending into the shank. The shank is substantially uniform in configuration except for the tapered tip, and has an axial length of about 0.75 inch. The crest diameter of the 6-32 screw threads is about 0.138 inch, and the root diameter thereof is about 0.0997 inch. This 0.138 inch crest diameter is a maximum, with the diameter possibly being as small as 0.132 inch due to manufacturing tolerances.

As is evident from the dimensions discussed above, cylindrical surface 26 has a diameter that is generally slightly larger than the crest diameter of the screw threads. It is advantageous to prevent an interference fit between the screw and cylindrical surface 26. The hexagonal portion 28 has a first diameter at the corners slightly larger than the crest diameter of the screw threads. The second diameter across the flat sides of hexagonal portion 28 is slightly larger than the root diameter of the screw threads, and slightly smaller than the crest diameter.

Thus, the shank of the mounting screw can be received in cylindrical surface 26 with a clearance around the circumference of the threads. Once the threads are maneuvered into the hexagonal portion 28, these threads self tap the surface of portion 28 forming internal threads in parts only of the planar sides of portion 28, without affecting the parts adjacent the corners. This threadedly retains the screw in the hexagonal portion and prevents removal thereof by applicaton only of an axial force.

The flat sides of hexagonal portion 28 form a plurality of discrete projections extending inwardly toward the center of the bore and separated by spaces adjacent the corners. The inwardly facing surfaces adjacent the corners define a first diameter slightly larger than the screw crest diameter. The innermost, central portions of the flat sides define a second diameter slightly smaller than the screw crest diameter and slightly larger than the screw root diameter.

In the first embodiment of FIGS. 1-4, bores 22 and 24 are connected by slot 29, defining a "dog bone" or "dumbbell" pattern. The longitudinal axes are spaced by a distance of about 0.234 inch. The slot has a width, in a direction perpendicular to a line connecting the bore longitudinal axes, of about 0.062 inch. This arrangement is particularly useful for weatherproof boxes to facilitate various electrical device and cover mounting positions.

With slot 29, the mold projections forming bores 22 and 24 can be connected and reinforced by a laterally extending member, pemitting the projections to withstand the harsh conditions experienced in molding aluminum. Additionally, the slot reduces the threading torque required by effectively eliminating one of the six sides of the hexagon by removing half of each of two adjacent sides which would otherwise be tapped with threads.

Figure 5:
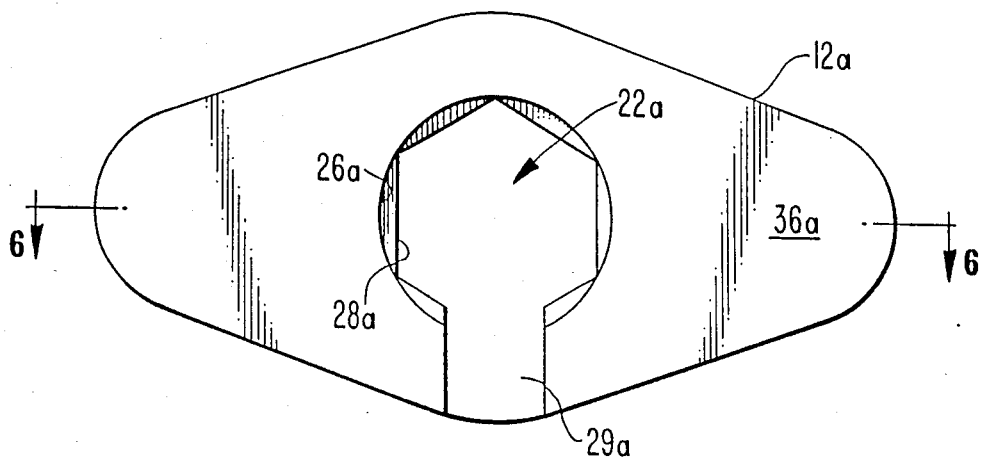
FIG. 5 is a top plan view of a boss of an electrical box in accordance with a second embodiment of the present invention.
Figure 6:
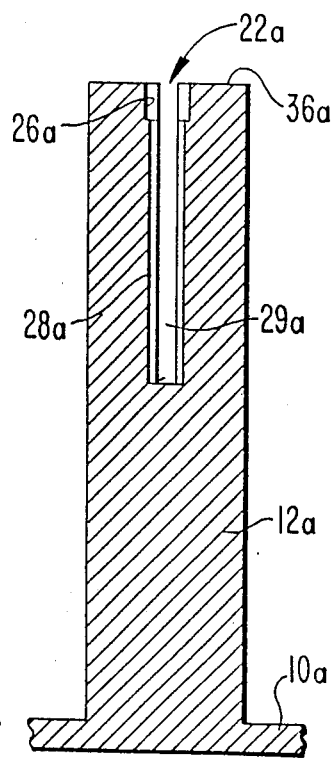
FIG. 6 is a side elevational view in longitudinal section taken along line 6—6 of FIG. 5.

In the second embodiment of FIGS. 5-7, features similar to those in the first embodiment are identified with the same reference number, but with the addition of the suffix "a". The boss 12a of the second embodiment only has single blind bore 22a extending inwardly from front face 36a. The bore comprises a substantially cylindrical surface 26a and a set of planar surfaces 28a defining a regular hexagon in transverse section, in sequence.

A slot 29a extends laterally from bore 22a and into the boss, passing through and eliminating a corner and one-half of two adjacent sides of the hexagon. The slot opens on the outer surface of boss 12a. This arrangement permits a reinforcing rib to extend from the mold projection forming the bore for forming the slot.

The bore cylindrical section 26 has an axial length of about 0.125 inch. The hexagonal section has an axial length of about 0.750 inch. The dimensions for the first and second diameters can be those listed for core nos. 1 and 2 in the first embodiment. The slot is about 0.061 inch wide.

The boss front face 36a is about 0.500 inch wide and about 0.250 inch high. The narrow ends have a radius of curvature of about 0.062 inch.

The operation of both embodiments is similar to that described in U.S. patent application Ser. No. 808,817, except for the omission herein of a frustoconical lead-in portion for the bore.

While advantageous embodiments have been chosen to illustrate the invention, it will be understood by those skilled in the art that various changes and modifications can be made therein without departing from the scope of the invention as defined in the appended claims.

What is claimed is:

1. An electrical box for supporting a device by an externally threaded screw, the screw having threads with a crest diameter and a root diameter, comprising:
   a boss integrally formed with the box and having a front face;
   a first straight self-tapping bore extending inwardly of said boss from said front face for receiving the screw, said bore having a substantially regular polygonal cross-sectional configuration with an even number of sides, said bore having a first diameter across corners of said polygonal configuration slightly larger than the crest diameter of the screw threads, and a second diameter across flat sides of said polygonal configuration slightly smaller than the crest diameter of the screw threads and slightly larger than the root diameter of the screw threads; and
   a slot extending laterally from said bore and into said boss.

2. An electrical box according to claim 1 wherein said boss is formed of metal.

3. An electrical box according to claim 2 wherein said metal is aluminum.

4. An electrical box according to claim 1 wherein said slot extends radially from a center of said polygonal configuration, eliminating a corner thereof.

5. An electrical box according to claim 1 wherein a second straight self-tapping bore extends inwardly of said boss from said front face, said second bore being parallel to and a mirror image of said first bore, said first and second bores being connected by said slot.

6. An electrical box according to claim 1 wherein said slot opens on an outer surface of said boss.

7. An electrical box according to claim 1 wherein said polygonal configuration is hexagonal.

8. An electrical box according to claim 7 wherein said first diameter is about 0.146 inch; and said second diameter is about 0.126 inch.

9. An electrical box according to claim 7 wherein said first diameter is about 0.143 inch; and said second diameter is about 0.124 inch.

10. An electrical box according to claim 7 wherein said first diameter is about 0.141 inch; and said second diameter is about 0.122 inch.

11. An electrical box according to claim 7 wherein said first diameter is about 0.139 inch; and said second diameter is about 0.120 inch.

12. An electrical box according to claim 1 wherein said bore comprises a cylindrical surface between said front face and said polygonal cross-sectional configuration, said cylindrical suface having a diameter at least substantially equal to the crest diameter of the screw threads.

13. An electrical box for supporting a device by an externally threaded screw, the screw having threads with a crest diameter and a root diameter, comprising:
   a boss integrally formed with the box and having a front face;
   a straight self-tapping bore extending inwardly of said boss from said front face for receiving the screw, said bore having a substantially regular polygonal cross-sectional configuration and a cylindrical surface between said front face and said polygonal cross-sectional configuration, said cylindrical surface having a diameter at least substantially equal to the crest diameter of the screw threads; and
   a slot extending laterally from said bore and into said boss.

14. An electrical box according to claim 13 wherein said boss is formed of metal.

15. An electrical box according to claim 14 wherein said metal is aluminum.

16. An electrical box according to claim 13 wherein said slot extends radially from a center of said polygonal configuration, eliminating a corner thereof.

17. An electrical box according to claim 13 wherein a second straight self-tapping bore extends inwardly of said boss from said front face, said second bore being parallel to and a mirror image of said first bore, said first and second bores being connected by said slot.

18. An electrical box according to claim 13 wherein said slot opens on an outer surface of said boss.

19. An electrical box for supporting a device by an externally threaded screw, the screw having threads with a crest diameter and a root diameter, comprising:
   a boss integrally formed with the box and having a front face;
   a straight self-tapping bore extending inwardly of said boss from said front face for receiving the screw, said bore having a plurality of discrete, inwardly extending porjections separated by spaces, said spaces being defined by iwnardly facing surfaces defining a first diameter slightly larger than the crest diameter of the screw threads, innermost surfaces of said projections defining a second diameter slightly smaller than the crest diameter of the screw threads and slightly larger than the root diameter of the screw threads; and
   a slot extending laterally from said bore and into said boss.

20. An electrical box according to claim 19 wherein said bore includes a cylindrical surface between said front face and said projections, said cylindrical surface having a diameter at least substantially equal to and only slightly larger than the crest diameter of the screw threads such that said cylindrical surface holds the screw in coaxial alignment with said first and second diameters.

21. An electrical box according to claim 19 wherein said projections are flat sides of a bore portion having a substantially regular polygonal cross-sectional configuration; and said spaces are corners of said polygonal cross-sectional configuration.

22. An electrical box according to claim 21 wherein polygonal configuration is hexagonal.

* * * * *